Dec. 27, 1960

C. E. LOMAX 2,966,551

PUBLIC ANNOUNCING SYSTEM

Filed May 14, 1957

2 Sheets-Sheet 1

INVENTOR.
Clarence E. Lomax
BY C. R. Sejer
Atty

Dec. 27, 1960

C. E. LOMAX 2,966,551

PUBLIC ANNOUNCING SYSTEM

Filed May 14, 1957

2 Sheets-Sheet 2

INVENTOR.

Clarence E. Lomax

BY C. R. Sipe

Atty.

United States Patent Office 2,966,551
Patented Dec. 27, 1960

2,966,551

PUBLIC ANNOUNCING SYSTEM

Clarence E. Lomax, Hastings, Nebr., assignor to Automatic Electric Laboratories, Inc., a corporation of Delaware Filed May 14, 1957, Ser. No. 659,063

9 Claims. (Cl. 179—6)

Figure 1:
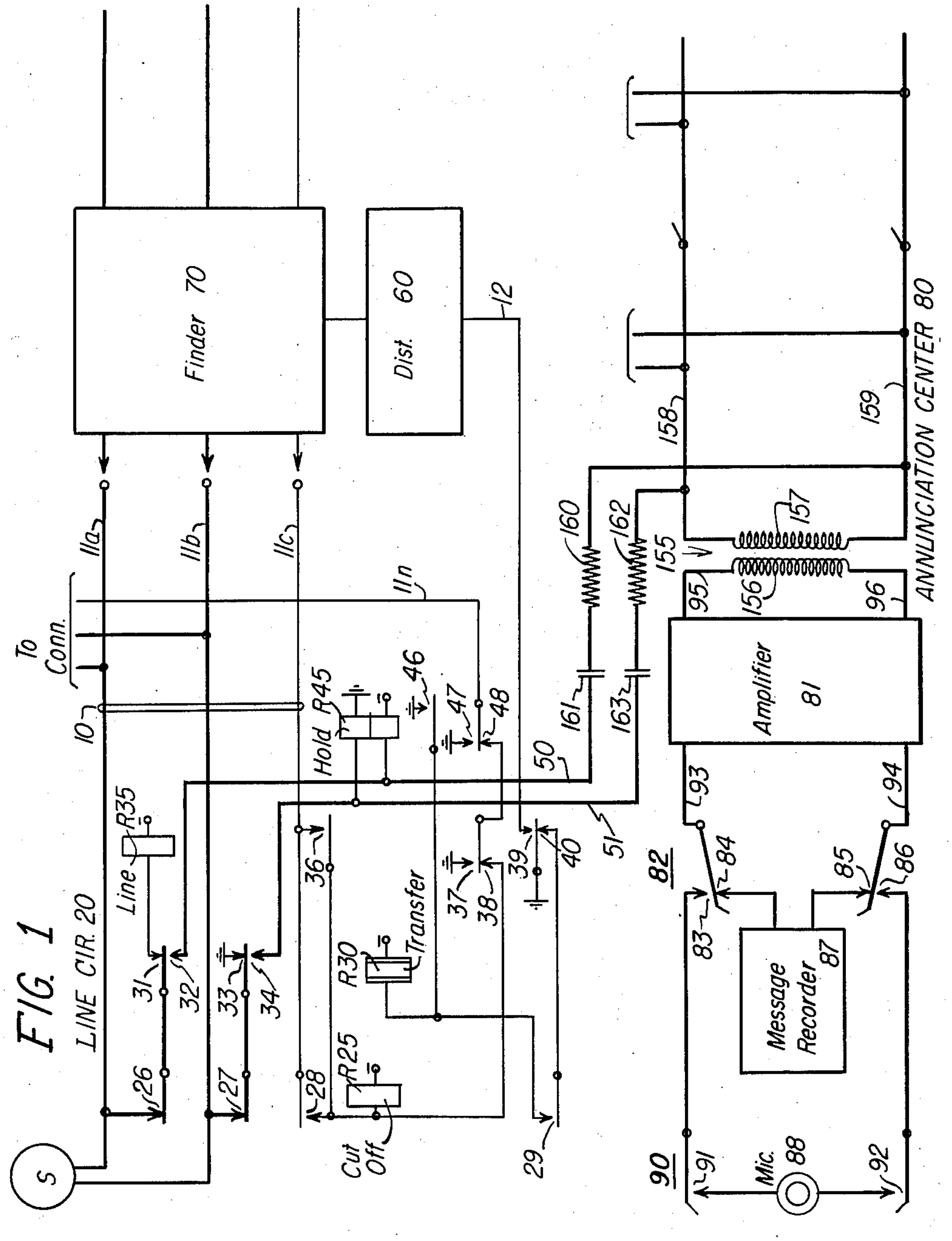

The present invention relates to a telephone system and particularly to a new arrangement in a telephone system for providing special message services.

At present most telephone message services providing information with regards to time of day, weather, sports, news, department store sales, and the like, have been rendered from one or a plurality of called stations and through the normal telephone exchange equipment to a calling telephone station. When traffic through the telephone exchange to the special message stations is light and intermittent, the normal exchange equipment is adequate for handling these calls. However, public acceptance, and accordingly popularity, of this type of service has increased so that in many instances a substantial overflow of uncompleted calls to the special message stations has been experienced. The occurrence of such an overflow condition is objectionable not only because it creates dissatisfaction with the parties sponsoring the message service and with the parties calling the message service, but also because it busies exchange equipment which might otherwise be utilized to extend other calls in the exchange, and during peak traffic periods causes delay in the extension of these other calls through the exchange. An obvious solution to this problem is to provide an additional equipment in the exchange to permit handling of the traffic load attributable to the message station. In most instances this solution is not acceptable because the cost of the additional exchange equipment must ultimately be borne by the parties sponsoring the services and such costs are usually prohibitive.

It is a general object of the present invention to provide an improved message service arrangement for a telephone system that avoids the above described problems.

More specifically, it is an object of the present invention to provide a message service arrangement utilizing exchange switching equipment only to set up a connection to the message station and wherein the equipment is released when the connection has been set up, thereby to permit the switching equipment to be utilized for other calls.

A further object of the invention is to provide in a telephone system message stations which are accessed directly from special line circuits which are selectively controllable for completing connections to the message stations.

An additional object of the invention is to provide in a telephone system a central message station, special line circuits having direct access to the central message station and a special called station accessible from the special line circuit through the exchange switching equipment, wherein the special called station is controllable to release a connection extended thereto in order to cause the switching equipment to release from the special line circuit and the associated calling line in order to cause the special line circuit to connect the associated calling line to the central message station.

Further features of the invention pertain to the particular arrangement of circuit elements in the message service arrangement, whereby the above outline and additional operating features thereof are attained.

Figures 2, 3:
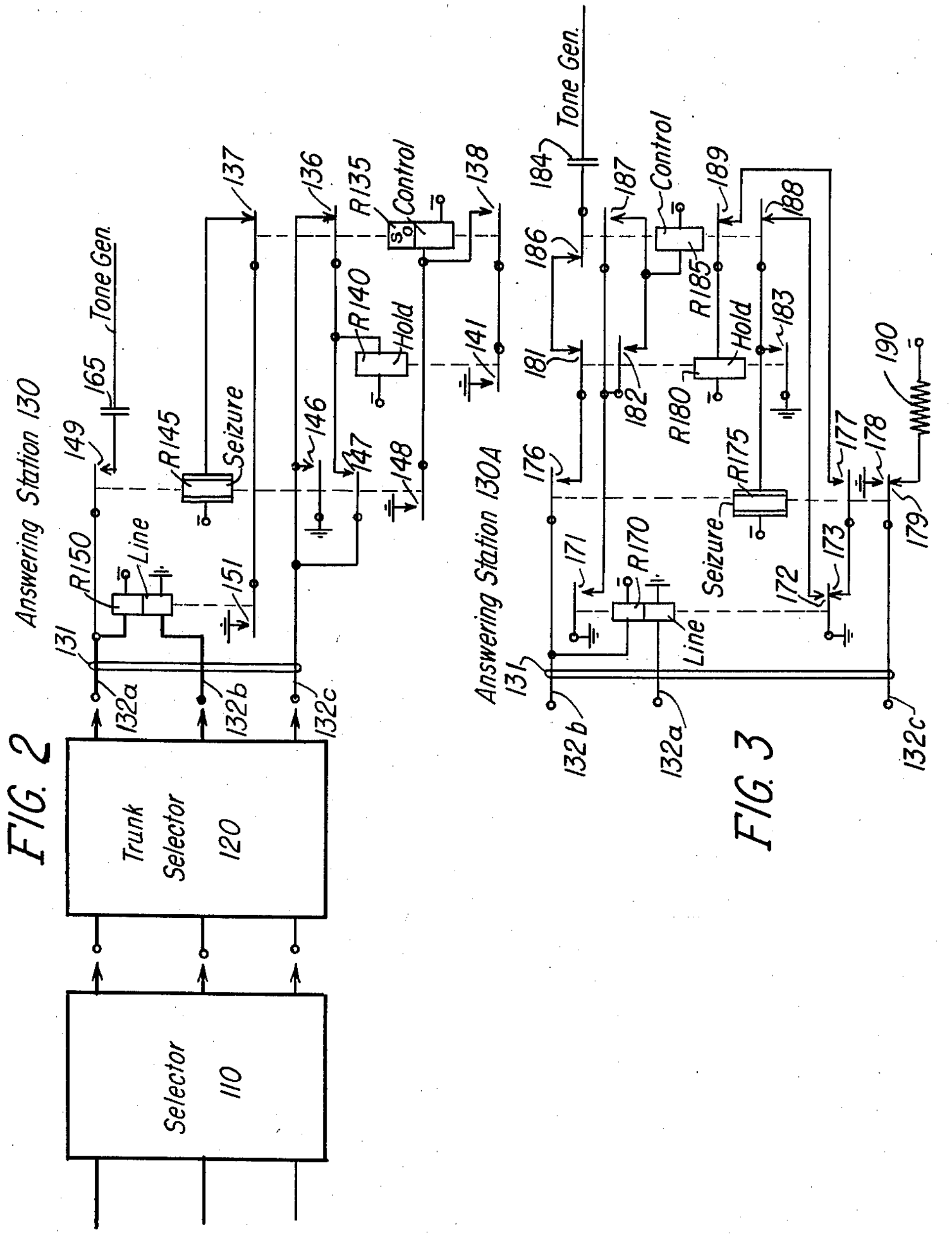

The invention, both as to its organization and method of operation, together with further objects and advantages thereof, will be best understood by reference to the following specification taken in conjunction with the accompanying drawings, in which:

Figs. 1 and 2, taken together, illustrate a telephone exchange including the improved message service arrangement in accordance with the invention; and Fig. 3 illustrates a circuit for the special called station that may be employed in the arrangement alternative to the special called station circuit shown in Fig. 2.

Referring to the drawings, there is shown in Figs. 1 and 2 a message service arrangement in an exchange including a subscriber station S terminating a subscriber line 10 having associated therewith a line circuit 20. The line circuit 20 is connected to a distributor 60 which is in turn connected in multiple to a plurality of finder-selector links including the finder-selector link made up of the finder 70 having access to the subscriber line 10 and the selector 110 controllable over the subscriber line 10 through the finder 70 for extending the connection to a plurality of destinations including the trunk selector 120. In addition, the line circuit 20 is connected via conductors 50 and 51 to an annunciation center 80 in the exchange. The trunk selector 120 is controllable from the subscriber line 10 through the finder-selector link to extend the connection to a plurality of stations including the answering station 130.

The subscriber line 10 is made up of two signal conductors 11*a* and 11*b* and a control conductor 11*c*, of which the conductors 11*a* and 11*b* are terminated in a conventional dial telephone instrument in the subscriber station S. The line circuit 20 includes a cut-off relay R25, a transfer relay R30, a line relay R35 and a hold relay R45. In addition, the line circuit 20 terminates the control conductor 11*c* of the subscriber line 10 and is accessible to the finder switches in the exchange and also terminates a control conductor 11*n* accessible to the connector switches in the exchange. The line circuit 20 is connected to the distributor 60 by means of a conductor 12 and, as previously pointed out, is connected by means of a pair of conductors 50 and 51 to the annunciation center 80.

The distributor 60 is of the conventional structure, being responsive to the application of a marking potential to the conductor 12 for operating an available one of the finders including the finder 70 for seizing a calling subscriber line including the subscriber line 10. The finder 70, selector 110, and trunk selector 120 are of conventional structure, being of the type which are released and restored to normal upon interruption at the called station of the extended connection.

The annunciation center 80 includes an amplifier 81 for amplifying signals from a message recorder 87 or, alternatively, the signals applied thereto from a microphone 88. The output from the amplifier 81 is applied to the conductors 95 and 96 and thereover to a coupler 155 by means of which the amplified signal is applied to a tapped line including the conductors 158 and 159.

The answering station 130 is accessed from trunk selectors including the trunk selector 120 via a trunk 131 including the conductors 132*a*, 132*b* and 132*c*, and includes a control relay R135, a hold relay R140, a seizure relay R145 and a line relay R150.

Considering now the operation of the line circuit 20 in seizing the finder-selector link, responsive to the removal of the telephone instrument from its cradle in the subscriber station S a circuit is completed from ground potential via contacts 33 and 27, conductors 11*b* and 11*a*, contacts 26 and 31, the winding of the line relay R35 to battery potential, whereupon the line relay R35 is operated. Upon operating the relay R35 closes contacts 36 for extending battery potential via the winding of the cutoff relay R25 to the control conductor 11*c* of the subscriber line 10 in order to mark the subscriber 10 as a calling line to the finders having access thereto. At the same time a circuit is closed at contacts 37 for extending ground potential via the contact 48 to the conductor 11*n*, accessible to the connector switches in the exchange, for marking the subscriber line 10 as busy. At the same time ground potential is applied at contacts 39 to the conductor 12 extending to the distributor 60, whereby the distributor 60 is operated to cause an available one of the finders to be operated to seize the calling line.

Assuming that the finder-selector link including the finder 70 is the link chosen by the distributor 60, the finder 70 seizes the subscriber line 10 and applies ground potential to the conductor 11*c* which is extended via the contacts 36 to the winding of the cutoff relay R25 in order to cause the relay R25 to operate. Upon operating the cutoff relay R25 closes contacts 28 for completing another connection to the conductor 11*c*, opens contacts 26 and 27 respectively for disconnecting the line relay R35 from the conductor 11*a* and for removing ground potential from the conductor 11*b*. In addition, the relay R25 closes contacts 29 to prepare a circuit for operating the transfer relay R30. Shortly thereafter the line relay R35 restores and opens contacts 36, 37 and 39, and closes contacts 38 and 40. At this time then, ground potential from the finder 70 is extended via the conductor 11*c*, contacts 28, 38 and 48 to the conductor 11*n* accessible to the connector switches in the exchange, and a circuit is completed from ground potential via the contacts 40 and 29 through the winding of the transfer relay R30 to battery potential. Accordingly, the start potential is removed from the conductor 12 extending to the distributor 60 and the transfer relay R30 is operated. Upon operating, the relay R30 interrupts contacts 31 and 33 and closes contacts 32 and 34 in order to prepare a circuit for operating the hold relay R45. At this time the conductors 11*a* and 11*b* of the subscriber line 10 are connected through the finder 70 to the selector 110 and dial tone is returned thereover to the subscriber station S in order to instruct the calling subscriber thereat to dial the called number.

At this time the subscriber at the subscriber station S may dial a directory number to extend a connection to any subscriber line or trunk in the exchange. One of the trunks to which the subscriber at the station S may extend a connection is the trunk 131 extending to the answering station 130, which station corresponds to the annunciation center 80 and is the station to which the subscriber extends a connection if he desires the special message service provided from the annunciation center 80.

Assuming that the subscriber at the subscriber station S desires to complete the connection to the annunciation center 80 and to receive the special message service provided thereby, he dials the directory number corresponding to the answering station 130 whereupon the selector 110 is operated to seize the trunk selector 120 and the selector 120 is operated to connect to the trunk 131. Assuming that the answering station 130 is idle, battery potential is applied to the conductor 132*c* via the winding of the hold relay R140 and contacts 136 so that the trunk selector 120 completes a connection thereto applying ground potential to the conductor 132*c* for operating relay R140 and extending a loop connection including conductors 11*a* and 11*b* from the subscribers station S to the conductors 132*a* and 132*b*, respectively, of the trunk 131. Thereupon, the line relay R150 is operated over the loop extended to the conductors 132*a* and 132*b*. The line relay R150 upon operating closes contacts 151 for extending ground potential via the contacts 137 through the winding of the seizure relay R145 to battery potential in order to operate the last named relay. At the same time the operated hold relay R140 closes contacts 141 for preparing a circuit for maintaining control relay R135 operated.

The seizure relay R145 upon operating closes contacts 148 for completing a circuit extending ground potential through the winding of the slow-to-operate control relay R135 to battery potential whereupon the relay R135 is energized and operates a short time thereafter. At the same time the relay R145 closes contacts 149 for connecting a tone generator through the capacitor 165 to the conductor 132*a* of the trunk 131 extending through the trunk selector 120, the selector 110, and the finder 70 to the conductor 11*a* of the subscriber line 10 to the telephone instrument in the subscriber station S and back over the conductor 11*b* of the subscriber line 10 to the conductor 132*b* and through the upper winding of the line relay R150 to ground potential, thereby to confirm to the the subscriber that the call has been extended to the station 130 corresponding to annunciation center 80 and that the connection to the annunciation center will be completed immediately.

Shortly thereafter the control relay R135 operates to close a hold circuit for itself at contacts 138 and to open at contacts 137 the circuit for operating the seizure relay R145. Thereupon the relay R145 restores to open contacts 149 and remove the tone signal from the conductor 132*a* and to open contacts 146 and 148 to remove ground potential from the conductor 132*c* and to remove ground potential from the control relay R135. The control relay R135 is maintained operated at this time from ground potential via the contacts 141 and 138. However, ground potential removed from the conductor 132*c* causes the trunk selector 120 to be released from its connection with the trunk 131 and also causes the hold relay R140 to restore.

Upon release, the trunk selector 120 interrupts the loop connection to the line relay R150 over the conductors 132*a* and 132*b* so that the line relay R150 restores and at the same time the hold relay R140 interrupts contact 141 for causing the control relay R135 to restore. Thus at this time the answering station 130 is restored to normal and battery potential is marked to the conductor 132*c* to indicate the station as being idle.

Upon restoring to normal, the trunk selector 120 causes the finder-selector link including the finder 70 and the selector 110 to restore to normal and to release from its connection to the subscriber line 10. Thereupon, ground potential is removed from the control conductor 11*c* of the subscriber line 10 so that the cutoff relay R25 in the line circuit 20 is restored. Upon restoring the cutoff relay R25 completes at contacts 26 and 27 a circuit extending from ground potential via the upper winding of the hold relay R45, contacts 34 and 27, conductor 11*b*, the telephone instrument at the subscriber station S, conductor 11*a*, contacts 26 and 32, and the lower winding of the hold relay R45 to battery potential in order to operate the hold relay R45. The cutoff relay R25 also opens at its contacts 29 the operating circuit for the transfer relay R30, which relay remains operated at this time inasmuch as it is of the slow-to-release type. Immediately thereafter, the hold relay R45 closes at its contacts 46 a circuit for maintaining the transfer relay R30 operated and closes contacts 47 for applying ground potential to the conductor 11*n* in order to indicate the subscriber line 10 as busy to the connector switches having access thereto. Thus at this time the transfer relay R30 and the hold relay R45 in the line circuit 20 is operated and will remain operated as long as the telephone instrument in the subscriber station S remains off its cradle and the subscriber may listen to the messages broadcast thereto from the annunciation center 80.

Assuming that in the annunciation center 80 the message recorder 87 is operative at this time, a circuit is completed at the contacts 84 and 85 of the switch 82 to the input conductors 93 and 94 of the amplifier 81 and the signal transmitted thereover is applied through the amplifier 81 to the conductors 95 and 96 terminated in a winding 156 of the coupler 155. The signals applied to the winding 156 of the coupler 155 are regenerated in the winding 157 thereof and applied to the line conductors 158 and 159 which are tapped by a plurality of pairs of conductors including the conductors 50 and 51. At this time then, the signals from the message recorder 87 are applied to the pairs of conductors including the conductors 50 and 51 and, assuming that the hold relay R45 in the line circuit 20 has been operated, the signal from the message recorder 87 is transmitted to the subscriber at the subscriber station S. Specifically, the signal transmitted and transferred to the winding 157 is transmitted in a loop, from one side of the winding via resistor 160, capacitor 161, conductor 50, contacts 32 and 26, conductor 11*a*, the telephone instrument at the subscriber station S, conductor 11*b*, contacts 27 and 34, conductor 51, capacitor 163, and resistor 162 to the other terminal of the winding 157. Accordingly, the subscriber at the station S may listen to the message transmitted from the annunciation center 80, free from interruption, for any period that he might enjoy.

The subscriber at the station S may terminate the connection to the annunciation center 80 by replacing the telephone instrument on the cradle, whereupon the loop extended via conductors 11*a* and 11*b* is interrupted, thereby interrupting the connection to the annunciation center 80 and to the hold relay R45. The relay R45 restores and opens contacts 46 for interrupting the operating circuit to the transfer relay R30 and opens contacts 47 for removing busy marking from the conductor 11*n*. At this time the line circuit 20 is completely restored, the subscriber line 10 is disconnected from the annunciation center 80 and is marked as idle to the connector having access thereto.

From the foregoing explanation it is clear that there is provided in this telephone system a special message service arrangement including a line circuit having a direct connection to an annunciation center wherein the line circuit is operated upon seizure and release of the subscriber line by a finder switch to complete a connection between the subscriber line and the annunciation center which connection is interruptable thereafter only by the subscriber at the connected subscriber station.

It is clear from the foregoing that the line circuit 20 will be operated to complete a connection between the subscriber line 10 and the annunciation center 80 when any calling connection between the subscriber station S and another remote station is interrupted first at the remote station. In order to place control of interrupting the call with the calling station, the answering station 130 is provided in the system which station is accessible to the subscriber line 10, and upon being called, responds by answering the call and by thereafter interrupting the connection in order to cause the line circuit 20 to be operated to extend a connection between the annunciation center 80 and the subscriber line 10.

An alternate arrangement for the answering station 130 is shown in the answering station 130*a* of Fig. 3. This circuit is controllable from the subscriber station for releasing the switches seized thereto and includes a line relay R170, a seizure relay R175, a hold relay R180 and a control relay R185. Seizure of the idle circuit at the trunk 131 by the trunk selector 120 is as described above with regards to the operation of the answering station 130. In this instance, battery potential is applied to the conductor 132*c* via the resistor 190 and contacts 179. Completion of the loop circuit at the conductors 132*a* and 132*b* operates the line relay R170 to close contacts 172 for completing the circuit from ground potential via contacts 172 and 188 through the winding of the seizure relay R175 to battery potential, whereupon relay R175 operates. Upon operating, relay R175 closes contacts 178 for applying seizure potential to the trunk selector 120 via the conductor 132*c*, closes contacts 177 for preparing a circuit to operate the hold relay R180 and closes contacts 176 to complete a circuit from the tone generator to the conductor 132*b* extending via the capacitor 184 and contacts 186, 181 and 176.

In this arrangement the tone signal indicates to the subscriber at the station S that the answering station has been seized and that the connection to the annunciation center 80 will be completed after the subscriber at the station S has interrupted the loop connection in the telephone instrument thereat. The subscriber may do this by dialing an additional number or by simply restoring and immediately reoperating the receiver cradle. In either event the loop to the line relay R170 is interrupted, causing the relay 170 to restore. Upon restoring, the relay R170 interrupts at its contacts 172 the circuit for operating the slow-to-release relay R175 and completes at its contacts 173 a circuit extending from ground potential via the contacts 173, 177 and 189 through the winding of the hold relay R180 to battery potential for operating the hold relay R180. Upon operating, the relay R180 closes contacts 183 to extend ground potential to the slow to release seizure relay R175 for maintaining the operation of the seizure relay, interrupts at the contacts 181 a point in the circuit for applying tone signal to the conductor 132*b*, and closes contacts 182 in order to prepare a circuit for operating the control relay R185.

Thereafter when the loop circuit is recompleted at the subscriber station S, the line relay R170 operates and closes at contacts 171 a circuit extending from ground potential and through the contacts 182 for operating the control relay R185. The control relay R185 immediately closes its contacts 187 to complete a hold circuit for itself from ground potential via the contacts 171, opens at contacts 186 a further point in the tone circuit, opens contacts 188 for interrupting the operating circuit for the seizure relay R175 and opens contacts 189 to interrupt the operating circuit for the hold relay R180. Thereafter, the hold relay R180 restores to open contacts 183 and causes the seizure relay R175 to restore shortly thereafter. Upon restoring, the relay R175 removes the seizure ground potential at contacts 178 from the conductor 132*c* whereby the trunk selector 120 is released to interrupt the connection to the trunk 131 and to restore to normal. Accordingly, the line relay R170 restores and upon restoring interrupts the operating circuit for the control relay R185. At this time then, the answering station 130*a* is completely restored to normal and marked as idle by the application of resistance battery to the conductor 132*c* of the associated trunk 131.

Considering for a moment annunciation center 80 shown in Fig. 1, the message recorder 87 may be switched out of the annunciation circuit by operating the switch 82 and the switch 90 in order to complete the connection between the microphone 88 and the amplifier 81 in a loop extending from the input conductor 93, contacts 83 and 91, the microphone 88 and the contacts 92 and 86 to to the input conductor 94. This arrangement is meant to illustrate the flexibility that may be attained in the annunciation center by means of which recorded messages relating, for example, to the weather, time of day, religious messages, department store sales information, may be provided, and also live messages relating, for example, to current news bulletins or on the spot coverage of sporting events could be provided. Any number of multiple message connections could be made into the annunciation center in order to provide a variety of message information and on a planned program schedule if so desired.

The advantage of this arrangement is not only that the switching apparatus in the exchange is utilized just for establishing a special message service connection and not for maintaining the connection, but also that, because of the necessity for a special line circuit, a basis is established for a charge to the party utilizing the special message services, whereby costs of such special message services may be better distributed between sponsors and users alike.

While there has been described what is at present considered to be a preferred embodiment of the invention, it will be understood that various modifications may be made therein, and it is intended to cover in the appended claims all such modifications as fall within the true spirit and scope of the invention.

What is claimed is:

1. In a telephone system, a subscriber line terminated in a subscriber station, a plurality of answering stations, a switch train selectively operated to extend a connection from said subscriber's line to one of said plurality of answering stations, releasing means in said one answering station, said releasing means automatically operative responsive to the extension of a connection thereto for releasing said answering station and said switch train from said subscriber line, a line circuit individual to said subscriber line, an annunciation center for transmitting messages and directly connectible to said line circuit, and means in said line circuit responsive to said release of said switch train for connecting said annunciation center through to said subscriber line.

2. In a telephone system, a subscriber line terminated in a subscriber station, plurality of answering stations, a switch train selectively operated to extend a connection from said subscriber line to one of said plurality of answering stations, releasing means in said one answering station, said releasing means automatically operative responsive to the extension of a connection thereto for releasing said answering station and said switch train from said subscriber line, a line circuit individual to said subscriber line, an annunciation center for transmitting messages, relay means in said line circuit for normally disconnecting said annunciation center from said subscriber line, said relay means effective upon the release of said switch train for connecting said annunciation center directly to said subscriber line.

3. In a telephone system, a subscriber line terminated in a subscriber station, a plurality of answering stations, a switch train selectively operated to extend a connection from said subscriber line to one of said plurality of answering stations, releasing means in said one answering station, said releasing means automatically operative responsive to the extension of a connection thereto for releasing said answering station and said switch train, a line circuit individual to said subscriber line, an annunciation center for transmitting messages, a cut-off relay in said line circuit operated upon said extension of a connection to disconnect said annunciation center from said subscriber line, a transfer relay in said line circuit operated responsive to the operation of said cut-off relay for preparing a connection between said annunciation center and said subscriber line, a hold relay in said line circuit connected in parallel with said annunciation center, said cut-off relay restored responsive to the release of said switch train for completing said prepared connection between said annunciation center and said subscriber line, said hold relay operated responsive to said last connection for maintaining said transfer relay operated.

4. In a telephone system as claimed in claim 3, including a source of tone generator in said answering station, and means effective in said answering station for momentarily transmitting said tone to said subscriber station as an answering signal prior to the automatic operation of said releasing means.

5. In a telephone system, a subscriber line terminating in a subscriber station, a plurality of answering stations, a switch train selectively operated to extend a connection from said subscriber's line to one of said plurality of answering stations, releasing means in said one answering station, a line circuit individual to said subscriber line, an annunciation center for transmitting messages and connectible directly to said line circuit, signalling means in said one answering station, said signalling means momentarily transmitted over said connection to said subscriber line for returning a momentary answer signal to said subscriber station, said releasing means effective directly after said momentary signal for automatically releasing said answering station and said switch train, and means in said line circuit responsive to the release of said switch train for connecting said annunciation center through to said subscriber line.

6. In a telephone system, a subscriber line terminated in a subscriber station, a plurality of answering stations, a switch train selectively operated to extend a connection from said subscriber line to one of said plurality of answering stations, a line circuit individual to said subscriber line, an annunciation center for transmitting messages and connectible directly to said line circuit; the combination in said answering station comprising a seizure relay, a line relay operated responsive to the extension of said connection to said answering station via said switch train, said line relay operating to close a first circuit to operate said seizure relay, a source of answer signal, a hold relay and a control relay; said seizure relay operating to simultaneously close a second circuit to connect said source of answer signal to said extended connection to instruct the calling party to anticipate a transmitted message, to close a third circuit to operate said hold relay, and to close a fourth circuit to operate said control relay, said control relay operating to interrupt said first circuit to restore said seizure relay in order, successively, to disconnect said source of answer signal and restore said hold relay and to release said switch train and restore said control relay; and relay means in said line circuit effective responsive to said release of said switch train for directly connecting said annunciation center to said subscriber line.

7. In a telephone system, a subscriber line terminated in a subscriber station, a plurality of answering stations, a switch train selectively operated to extend a connection from said subscriber's line to one of said plurality of answering stations, releasing means in said one answering station, a line circuit individual to said subscriber line, an annunciation center for transmitting messages and connectible directly to said line circuit, a source of tone generator in said answering station transmitted back to said subscriber station responsive to said connection being extended to said answering station to notify said calling substation to momentarily interrupt said connection at said substation, said releasing means effective responsive to a momentary interruption of said connection at said substation for releasing said answering station and said switch train from said subscriber's line, and means in said line circuit responsive to the release of said switch train for directly connecting said annunciation center to said subscriber's line.

8. In a telephone system, a subscriber line terminating in a subscriber station, a plurality of answering stations, a switch train selectively operated to extend a connection from said subscriber line to one of said plurality of answering stations, releasing means in said one answering station, signalling means in said one answering station transmitted over said connection to said subscriber station responsive to the extension of said connection for notifying said calling subscriber to momentarily interrupt said connection, a line circuit individual to said subscriber line, an annunciation center for transmitting messages and connectible directly to said line circuit, said releasing means effective responsive to the momentary interruption of said connection at said subscriber station for releasing said answering station and said switch train from said subscriber line, and relay means in said line circuit responsive to the release of said switch train for directly connecting said annunciation center through to said subscriber line.

9. In a telephone system, a subscriber line terminated in a subscriber station, a plurality of answering stations, a switch train selectively operated to extend a connection from said subscriber line to one of said plurality of answering stations, a line circuit individual to said subscriber line, an annunciation center for transmitting messages and connectible directly to said line circuit, the combination in said answering station comprising a seizure relay, a line relay operated responsive to the extension of said connection to said answering station via said switch train, said line relay operating to close a first circuit to operate said seizure relay, a source of answer signal, a hold relay and a control relay, said seizure relay operating to connect said source of answer signal to said extended connection to instruct the calling party to momentarily interrupt the connection at said subscriber station, said line relay momentarily releasing responsive to the momentary interruption of the extended connection at the subscriber station to open said first circuit to said seizure relay, and close a second circuit to operate said hold relay; said hold relay operating to simultaneously close a third circuit to maintain said seizure relay operated, to disconnect said source of answer signal, and prepare a circuit to said control relay, said line relay reoperating over said extended connection responsive to the termination of said momentary interruption of the connection at said subscriber station, said line relay reoperating closing a fourth circuit to operate said prepared control relay, said control relay operating to interrupt said second circuit to restore said hold relay in order, successively, to restore said seizure relay and to release said switch train; and relay means in said line circuit effective responsive to the release of said switch train for directly connecting said annunciation center to said subscriber line.

References Cited in the file of this patent

UNITED STATES PATENTS

| | | |
|---|---|---|
| 1,670,252 | Gardner | May 15, 1928 |
| 2,207,855 | Franklin | July 16, 1940 |
| 2,213,511 | Bennett | Sept. 3, 1940 |
| 2,385,968 | Deakin | Oct. 2, 1945 |
| 2,764,636 | Gray | Sept. 25, 1956 |
| 2,774,822 | Dunlap et al. | Dec. 18, 1956 |
| 2,833,863 | Kosten | May 6, 1958 |